Jan. 22, 1935.   A. W. KETTLE ET AL   1,988,690
SHOCK ABSORBER
Filed March 15, 1930
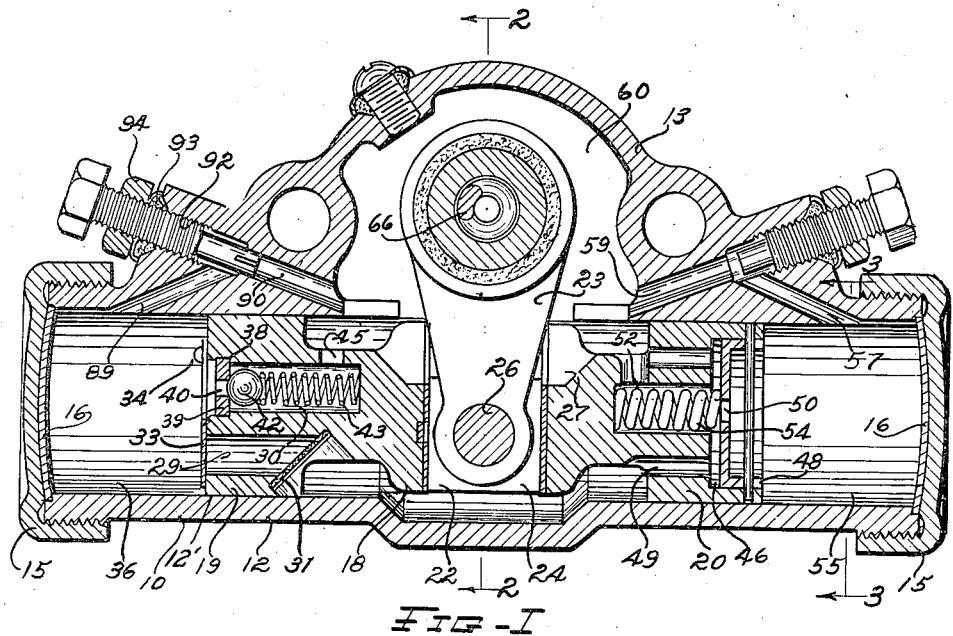
FIG-1
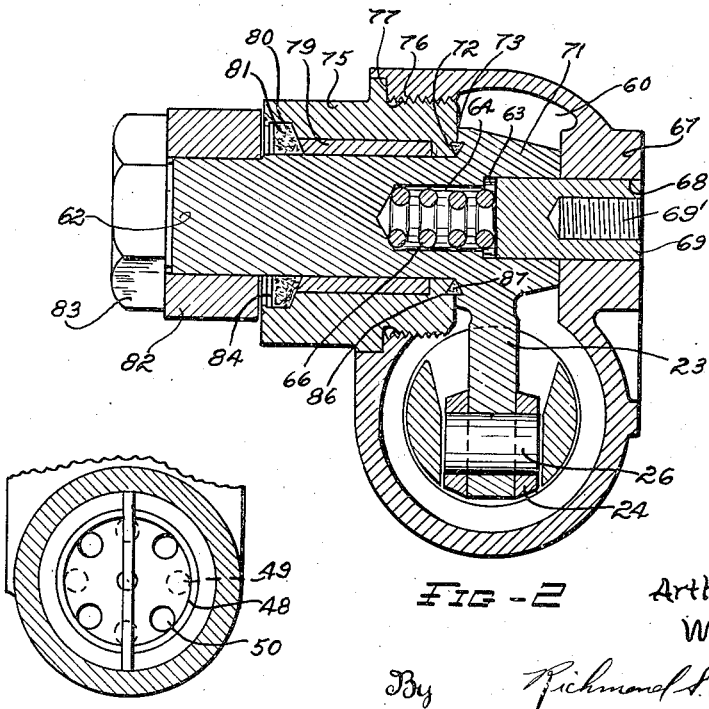
FIG-2
FIG-3
Inventors
Arthur W. Kettle
Wade Doty
By Richmond S. Hayes
Attorney Patented Jan. 22, 1935

1,988,690

UNITED STATES PATENT OFFICE 1,988,690

SHOCK ABSORBER

Arthur W. Kettle and Wade Doty, Jamestown, N. Y., assignors to Two-Way Shock Absorber Company, Jamestown, N. Y., a corporation of New York Application March 15, 1930, Serial No. 436,006

7 Claims. (Cl. 188—88)

This invention relates to an improvement in hydraulic shock absorbers and more particularly to a thermostatic control therefor.

In its preferred embodiment this device provides structural compensating means for the viscosity change of fluid contained therein due to temperature changes.

Prior to this invention hydraulic shock absorbers have been produced in which, in one form or another, a system of variable bypasses and automatic emergency or relief valves have been provided. The purpose of a system of this kind, obviously, is to facilitate the control of fluid flow from one piston chamber to another (in the case of a double acting device) and to prevent the building up of excessive pressures which would tend to render the device inoperative. Through experience it has been learned that, while the various valve systems in devices now on the market, control and regulate fluid flow with a more or less degree of accuracy, they fail utterly to properly control said flow, during or as a result of any considerable temperature changes. To be more definite, a device installed upon an automobile and adjusted in a building having a temperature of seventy degrees, may or may not function as it was adjusted when the automobile is out of doors, this being dependent entirely upon the out of door temperature relative to the building temperature. If the out of door temperature is low and, as stated above, the device was adjusted under a relatively warm temperature, the fluid in the device will become heavy and, instead of flowing readily through the system, will build up uncontrolled pressure, the result of which is to increase rather than decrease the jar to the device which the shock absorber was intended to at least partially overcome.

It would appear, therefore, that one of two conditions must be altered in order to maintain the proper relation between a hydraulic shock absorber and the fluid contained therein; (1) provide a fluid having a constant viscosity regardless of temperature changes or (2) provide a valve system thermostatically controlled to permit fluid passage regardless of the viscosity of the fluid. At the present time, no suitable fluid for hydraulic shock absorbers is available which has a uniform flow regardless of temperature and therefore no advance in this direction may be made. Attempts have been made to provide readily accessible manual adjustment of the valve system of a shock absorber in order that a uniform performance may be had regardless of the condition of the fluid. While this latter arrangement is possible, it is not advisable for the obvious reason that no owner of a device to which the shock absorber is applied can or will take the time to adjust a system of valves everytime the temperature varies ten or more degrees. It may be understood, therefore, that the only alternative direction in which improvement may be made is by providing thermostatic control to assure uniform performance of the shock absorber regardless of temperature conditions.

In the following specification applicant discloses a hydraulic shock absorber in which the usual fluid for devices of this kind is used. The structure of the device is such that, when the fluid contained therein becomes heavy and viscous, due to low temperature, the ports or bypasses automatically alter to permit rapid flow from one end of the device to the other and which, when the temperature is relatively high and the fluid relatively thin and mobile, again alter to curtail the flow.

The principal object of this invention is therefore to produce a hydraulic shock absorber in which the fluid flow is thermostatically controlled.

Another object of this invention is to provide a device of this class in which one of the elements of the device is adapted to automatically and by thermostatic control permit or prevent passage of the fluid from one end of the shock absorber to the other.

Further objects of this invention reside in the details of construction and may be more clearly understood by a consideration of the following specification which is taken in conjunction with the accompanying drawing; and in which Fig. 1 is a longitudinal vertical sectional view of a hydraulic shock absorber embodying one form of this invention;

Fig. 2 is a transverse vertical sectional view taken substantially on the line 2—2 of Figure 1; and Fig. 3 is a transverse sectional view about on line 3—3 of Fig. 1.

It is a well known fact that, due to temperature changes, certain metals or combination of metals react with a greater physical change than others. For example, the coefficient of expansion or contraction of iron is relatively small compared with that of aluminum and again the coefficient of expansion of aluminum is less than that of zinc. By reason of the difference in rate of expansion per degree change in temperature of various metals, it has been found advisable to produce the pistons and manually adjustable bypass valves from a metal or alloy having an extremely high coefficient of expansion per degree change in temperature.

The shock absorber embodying this invention is generally indicated by the reference numeral 10 and is comprised of a casing 12 of generally cylindrical form, from the central portion of which projects a shell 13 which encloses and supports the actuating arm. The ends of the shell 12 are threaded to receive threaded caps 15. The caps are adapted to contact with and cause engagement of the sealing discs 16 with the casing 12. The method of sealing the ends of the casing against fluid leakage is set forth in the co-pending application Serial No. 410,161, for an improvement in Cylinder closures, invented by Allan A. Thayer.

Mounted in the casing 12 is a double ended piston 18 which, for the purposes of description, is designated as high pressure piston 19 and low pressure piston 20. A rectangular opening 22 is formed in the piston 18, with the walls of which a rocker arm 23 is engaged. Plates 24, secured by the pin 26 to the rocker arm, slidably engage the walls of the openings 22. Adjacent the upper edge of the opening 22, the walls of the piston are cut away at 27 to permit greater movement of said rocker arm relative to the piston.

The high pressure piston 19 is provided with two longitudinally extending parallel openings 29 and 30. Adjacent the rear of the opening 29, a screen 31 is provided which catches and stops the flow of dirt or other foreign particles through the system. These particles, it has been found, tend to clog the bypasses and cause the device to become inoperative. The opening 29, adjacent the head of the piston is closed by a flapper valve 33 which is secured to the face of the piston in any suitable manner as by the pin 34. This valve permits fluid flow from the rear of the piston into the high pressure chamber 36 but closes during the travel of the piston 19 into said chamber thus causing the fluid to pass out through controlled openings in the center of the device. The opening 30 is formed with a shoulder 38 against which is fitted a plate 39 through which an opening 40 is drilled. Mounted in the opening 30 is a ball check 42 which is caused to close the opening 40 in the plate 39 by reason of contact with a spring 43. An opening 45 connects the opening 30 with the rear of the piston. This automatic valve operates only when the device has been subjected to a severe shock and at which time it is necessary to momentarily relieve the fluid pressure strain upon the casing. The increased pressure within the high pressure chamber 36 causes the ball 42 to depress the spring 43 and allow a certain amount of the fluid to pass through the openings 40, 30 and 45 thus instantly relieving the pressure in said chamber.

The low pressure piston 20 is provided with a recessed opening 46 in which is supported a cup-like valve member 48. The base wall of the recess has a plurality of openings 49 therein which connect with the rear of the piston. The valve plate 48 is formed with openings 50 which openings, with the exception of the central one, are staggered relative to the openings 49 in the piston. A large central cavity 52 is formed in the piston directly beneath and centered with the central opening of the valve plate. A spring 54 is mounted in the opening and adapted to normally cause the base wall of the valve plate to be removed from the base wall of the recess. Under these conditions, when the piston is traveling into the low pressure compartment 55, as a result of a moderate shock, the tension of the spring 54 causes the valve plate to remain in the position such that all of the openings in said plate and said piston permit fluid flow from the low pressure chamber to the rear of the piston. This condition prevails only for an instant after which the pressure in the chamber 55 is sufficiently great to depress the valve plate 48, against the base wall of the recessed opening 46. This action of the valve plate closes all but the small central opening and causes most of the fluid to pass from the low pressure chamber 55 through a bypass 57 formed in the casing, thence past an adjusting valve and out through passage 59 into the reservoir chamber 60.

The rocker arm 23 has extending at right angles thereto a shaft 62. In the end of the shaft, adjacent the arm, a central opening 63 is made. A slightly reduced opening 64 continues inwardly beyond the opening 63. Mounted in the opening 64 is a spring 66. The rear wall 67 of the casing 12 is reinforced and has drilled therethrough an opening 68 in which is mounted a bearing plug 69. The inner end of the plug projects beyond the wall 67 into and is engaged with the walls of the opening 63 and is retained in the wall by any conventional means, as for instance by splitting the plug and inserting a screw in the internal threads 69'. The plug 69 constitutes the bearing support for the reciprocating rocker arm 23. The shaft 62, at its connection with the rocker arm, is slightly enlarged as at 71 and thus provides an annular shoulder 72. A wedge shaped annular recess 73 is cut into the shoulder 72 for a purpose which will later be set forth.

The shaft 62 is supported adjacent the front of the casing in a collar 75 which, by means of threads 76, removably engages said casing. The flange 77 on the collar 75 defines a limit of engagement thereof with said casing. A bronze or other bushing 79 is cast integral with or press fitted into the collar 75 and acts as a bearing support for the portion of the shaft 62 lying therewithin. The outer end of the collar 75 is formed with a recess 80 in which suitable packing 81 is located. The connecting arm 82 is mounted on the outer end of the shaft 62 and held in place by a nut 83. To prevent dislodgment of the packing 81, a disc or washer 84 is placed about said shaft in engagement with said packing and is so held by peening over the outer edges of the walls of the packing recess 80.

The inner vertical wall of the collar 75 is formed with a wedge shaped annular recess 86 which corresponds in size and location to the recess 73 in the shaft 62. When the collar 75 and shaft 62 are joined together the two wedge shaped recesses 73 and 86 form a triangular recess in which packing 87 is located. It may readily be appreciated that the more closely the collar 75 is engaged with the casing the closer the engagement of said collar with the shaft 62. Thus, with the packing 87 in place, said packing will be compressed as a wedge about the inner portion of the shaft 62 and prevent fluid leakage from the reservoir 60 along the shaft and to the exterior of the device.

The valves controlling the bypasses from the high and low pressure chambers 36 and 55 are identical and therefore but one will be described. Opening into the high pressure chamber 36 is a passageway 89 which in turn opens into an annularly disposed passageway 90 connected with the reservoir 60. Mounted in the passageway 90 and threadably engaged with the walls thereof is a valve 92 about which is placed suitable packing 93. A lock nut 94 prevents undesired adjustment of the valve. The valve 92 is adjustable to increase or decrease the size of the connecting passage between the passageways 89 and 90. In this fashion the rapidity of fluid flow from both high and low pressure chambers 36 and 55 into the reservoir 60 is controlled.

As set forth above, the structure of the shock absorber is, with the exception of detailed improvements, based on the same principle of operation with that of other hydraulic shock absorbers. However, in this device the piston 18, including both high and low pressure piston heads 19 and 20, as well as the valves 92, are formed from metal having an extremely high coefficient of expansion and contraction such as zinc or aluminum or their alloys, while the casing is made of a material with a relatively low coefficient of expansion, such as iron or certain of its alloys. Heretofore, pistons and valves have preferably been formed from metal having little or no susceptibility to expansion and contraction by reason of temperature changes in order to obtain uniform operation of the device. This device, by providing piston and valves of metal most susceptible to expansion and contraction by reason of temperature changes, produces a thermostatic control for the passage of the fluid during operation of the device. For example, the device is assembled under normal inside temperature, the piston having only a working clearance with the walls of the casing 12. The fluid used in the device is relatively mobile by reason of the warm temperature and when the device is actuated can only pass through the channels provided therefor. When the device is taken out of doors, where the temperature may be considerably lower than that under which the device was assembled, the viscosity of the fluid increases and said fluid will not readily flow through the passageways. However, as a result of the change in temperature, the piston has shrunk away from the walls of the casing 12 thus creating around the edge thereof a small passageway 12' through which a certain amount of fluid may flow from the compression chamber to the rear of the piston. It has been well demonstrated that piston shrinkage resulting from a change from warm to cold temperature is sufficient to produce a passageway about the piston through which a certain amount of the viscous fluid may flow. The amount of fluid which passes the piston in this manner is fully fifty percent of that contained in the compression chamber and as a result the passageway from the high compression chamber to the reservoir is now required to by-pass less than half of the fluid. For this reason no abnormal pressure is built up in the compression chamber as a result of the low mobility of the fluid.

The converse of the above is equally true. For instance, should the shock absorber be subjected to a change from low to high temperature, the piston expands proportionately with the change or increase of mobility of the fluid. Therefore, by the time the fluid is sufficiently warmed and thinned down to flow readily, the piston has expanded to closely engage the walls of the casing 12 and the only outlet for the fluid in either of the compression chambers is through the valve controlled passageways.

To further carry out the thermostatic control of a device of this kind, it is contemplated to form the valves 92 from the same kind of metal used in the piston. The expansion or contraction of the valves will then be uniform with that of the piston and proportionate to the change in viscosity or mobility of the fluid in the device. When the fluid viscosity is high and its relative mobility low the valves will be of slightly reduced size thus permitting freer passage of the fluid therearound, whereas, when the viscosity of the fluid is relatively low, and the mobility relatively high, the valves will be of increased size to curtail the fluid flow.

It is well known that thermostatic devices, embodying the principle wherein metals having a high linear coefficient of expansion, are in use, but it is believed that use of metals having a high coefficient of expansion and contraction have not heretofore been resorted to in connection with a shock absorber and therefore applicants do not intend to be limited in the spirit and scope of their invention, other than as set forth and defined by the hereunto annexed claims.

Having thus set forth our invention what we claim as new and for which we desire protection by Letters Patent is:

1. A fluid shock absorber comprising a chambered casing, a piston having a high pressure face and a low pressure face oppositely facing toward the opposite ends of the casing chamber, a transfer passage providing means of escape for the fluid from in front of the advancing high pressure face of the piston, a normally closed valve for the transfer passage normally acting to resist the escape of fluid through said passage and yieldable to open the passage for the escape of fluid when subjected to abnormal pressure, a second transfer passage providing means of escape for the fluid in front of the low pressure face when the latter is advancing, and a normally open valve for the second transfer passage normally acting to provide free escape of the fluid therethrough and yieldable under predetermined abnormal pressure to a closed position for restricting such fluid escape.

2. A fluid shock absorber comprising a casing having a chamber, a piston in the chamber, a by-passage from one part of the chamber to another part thereof about the piston, a passage in said piston for establishing communication between the portions of the chamber at opposite sides of the piston, a thermostatic control for one of said passages acting to vary the transfer capacity thereof, and a relief valve normally restricting the companion passage and adapted, under abnormal pressure, to open the same for the relief of such pressure upon forward movement of the piston.

3. A fluid shock absorber comprising a chambered casing, a piston therein, a passage disposed angularly to said chambered casing providing means of escape for the fluid from in front of the advancing piston, a screw threaded in the casing at an angle in the passage substantially axially of a portion of the passage, said screw having an extension from its inner end, said extension having its free end disposed in said portion of the passage and composed of metal thermally expansible and contractible to a greater degree than the wall of said passage portion, said passage intermediate said portion and the threaded screw being enlarged about the extension.

4. A fluid shock absorber comprising a casing having a chamber, a piston movable therein, a passage establishing communication between the portions of the chamber at opposite sides of the piston, and a valve having a reduced extension composed of a metal of a higher coefficient of expansion than the casing, said valve extension being slidably supported at its free end in the passage and acting under thermal influences to vary the capacity of the passage.

5. A fluid shock absorber comprising a chambered casing, a piston within the chamber of the casing having a by-pass clearance with respect to the chamber wall for by-passing a portion of the shock absorbing fluid from one side of the piston to the opposite side thereof, a supplementary passage providing means of escape for the shock absorbing fluid in advance of the piston, and thermostatic means for varying the capacity of the passage, said thermostatic means and the metal of said piston having a coefficient of thermal expansion higher than the coefficient of expansion of the casing to accommodate changes in the density of the fluid influenced by temperature changes.

6. A fluid shock absorber comprising a chambered casing, a piston having a high pressure face and a low pressure face oppositely facing toward the opposite ends of the casing chamber, a transfer passage providing means of escape for the fluid from in front of the advancing high pressure face of the piston, a normally closed valve for the transfer passage normally acting to resist the escape of fluid through said passage and yieldable to open the passage for the escape of fluid when subjected to abnormal pressure, a second transfer passage providing means of escape for the fluid in front of the low pressure face when the latter is advancing, a normally open valve for the second transfer passage normally acting to provide free escape of the fluid therethrough and yieldable under predetermined abnormal pressure to a closed position for restricting such fluid escape, controlled passages providing means of escape for the shock absorbing fluid from in advance of each face of the piston, and thermostatic means for controlling the capacity of said controlled passages, said thermostatic means acting to vary the passage capacity to compensate for viscosity changes in the shock absorbing fluid, to thereby effect a substantially constant retarding action by the shock absorbing fluid under varying temperature changes.

7. A fluid shock absorber comprising a chambered casing, a piston within the chamber of the casing having a by-pass clearance with respect to the chamber wall for by-passing a portion of the shock absorbing fluid from one side of the piston to the opposite side thereof, a supplementary passage providing means of escape for the shock absorbing fluid in advance of the piston, and a thermostatic valve for varying the capacity of the supplementary passage, said valve and said piston being composed of metal having substantially a like coefficient of expansion, and both acting conjointly to effect a substantially constant retarding action by the shock absorbing fluid.

ARTHUR W. KETTLE.
WADE DOTY.